March 9, 1943.  A. W. HUBBARD  2,313,240
OPHTHALMIC APPARATUS
Filed July 3, 1940  2 Sheets-Sheet 1
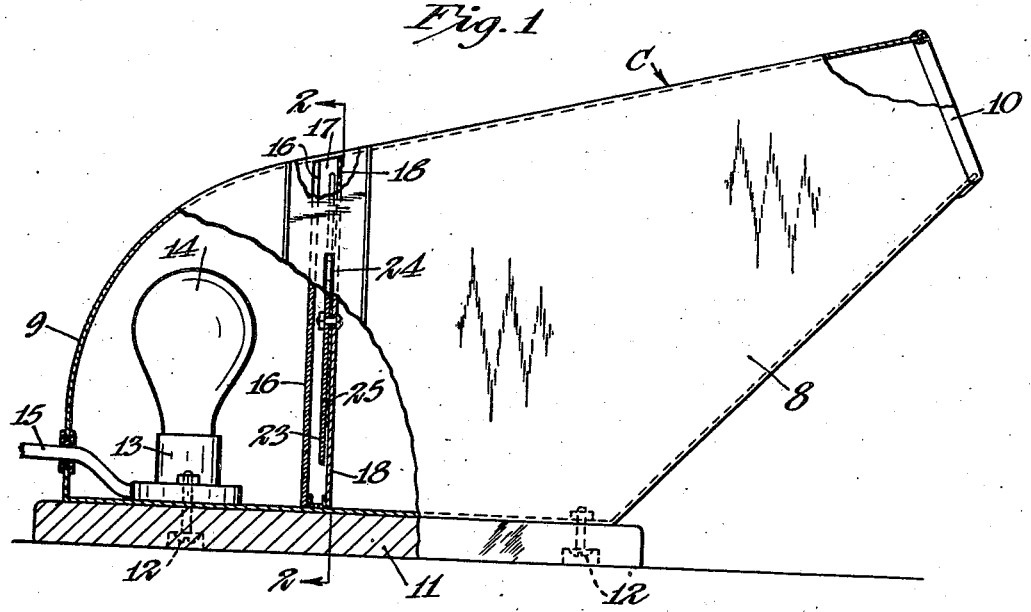
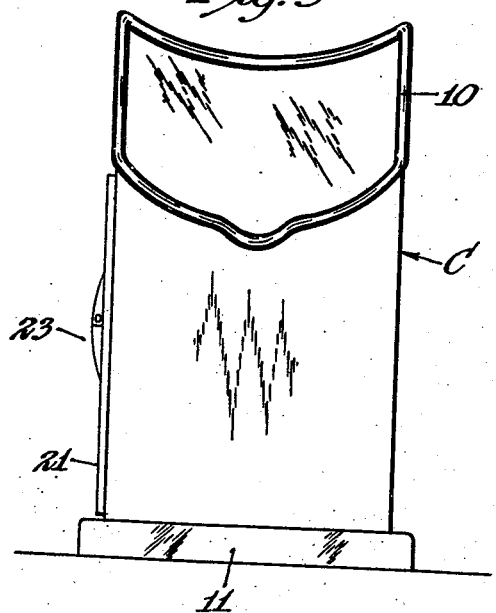
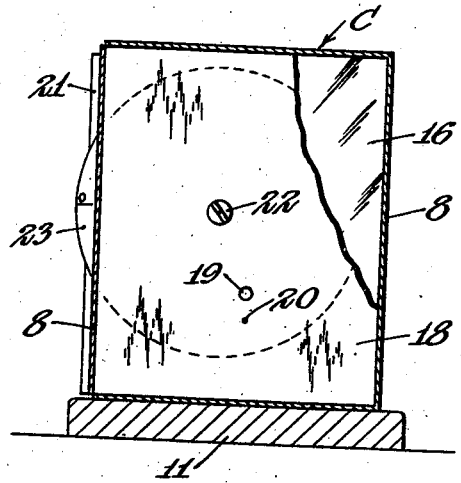
Inventor
Alfred W. Hubbard
By Williamson + Williamson
Attorneys March 9, 1943.  A. W. HUBBARD  2,313,240
OPHTHALMIC APPARATUS
Filed July 3, 1940   2 Sheets-Sheet 2
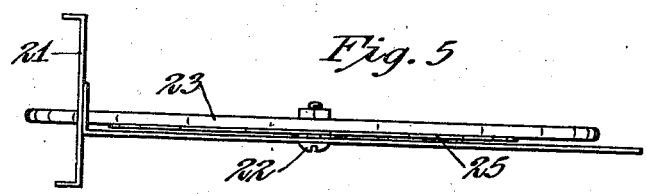
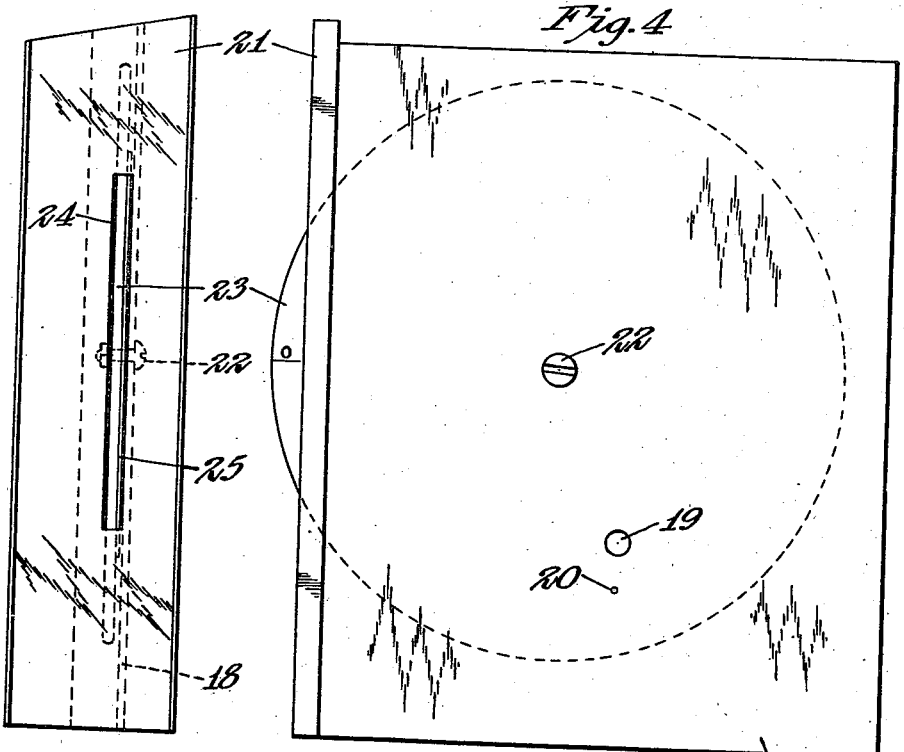
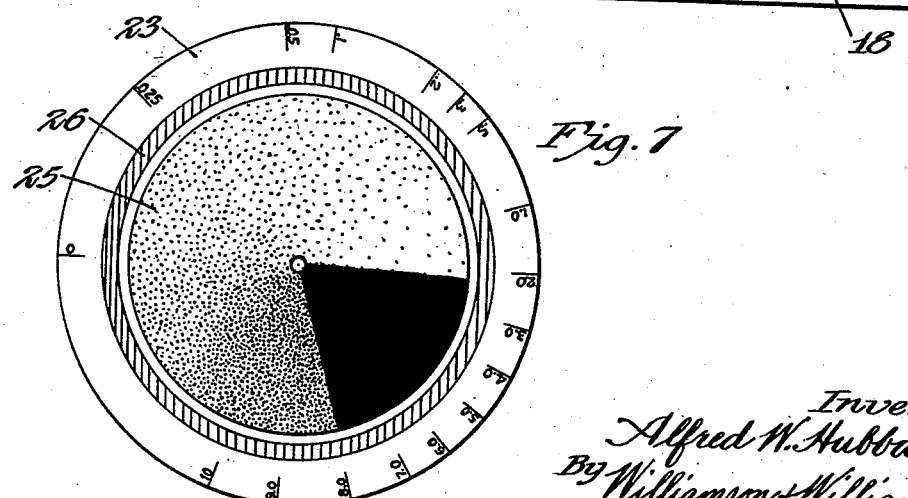

Patented Mar. 9, 1943

2,313,240

UNITED STATES PATENT OFFICE 2,313,240

OPHTHALMIC APPARATUS

Alfred William Hubbard, Stillwater, Minn., assignor of one-half to Joseph C. N. Rowell, and one-half to Theodore H. Rowell, Baudette, Minn.

Application July 3, 1940, Serial No. 343,769

2 Claims. (Cl. 88—20)

This invention relates to ophthalmic devices and is particularly adaptable for use in connection with the determination of visual purple values in the human eye as well as measurement of the ability to regenerate visual purple.

That portion of the human eye which has a quality of detecting light is visual purple, a substance associated with the cones and rods of the eye, and when the eye is subjected to light visual purple is consumed. The ability of the eye to regenerate visual purple at a normal rate is dependent upon the amount of vitamin A in the human system and a lack of vitamin A nourishment results in a deficiency in visual purple and its regeneration and one of the common causes of this defect produces night blindness. As a matter of fact, a continued marked deficiency of vitamin A has been found to lead to serious eye difficulties.

It is an object of my invention to provide apparatus for measuring not only the visual purple content of the eye but also the ability of the eye to regenerate visual purple and to indicate an improvement in the rate of regeneration over a period of time while the patient is on an increased vitamin A diet. It is my aim to provide an instrument which is of relatively simple structure which can be produced at a reasonable cost and yet at the same time gives an accurate means of measuring the reaction of the eye to light.

A more specific object of the invention is to provide a simply constructed device which can be utilized to expose the eye to a bright light screen for a pre-determined period before the actual test to bring the eye to a condition from which comparative tests can be made and wherein the apparatus can, without complicated light source increases or reductions, be thereupon utilized in the actual test for visual purple content and regenerative power.

Another object of the invention is to provide in an ophthalmic device a light screen having a portion of graduated opacity through which light from the source can be viewed and on said screen to additionally provide a portion of fixed opacity viewable through a small aperture to provide a fixation point for the line of sight and produce conditions in the eye more satisfactory for the test.

These and other objects and advantages of the invention will more fully appear from the following description made in connection with the accompanying drawings, wherein like reference characters refer to the same parts throughout the views, and, in which:

Fig. 1 is a side elevation of my invention with portions broken away to show interior structure;

Fig. 2 is a section taken approximately on line 2—2 of Fig. 1;

Fig. 3 is a front end view of the device;

Fig. 4 is a front elevation of the interior partition;

Fig. 5 is a top view of said partition and rotary light screening disc;

Fig. 6 is an end view of said partition with a light shield associated therewith; and Fig. 7 is a plan view of the rotary light screening disc.

In the drawings there is shown a casing C which includes a side wall 8, a rear wall portion 9 and an eye piece 10. The casing is mounted upon a base 11 to which it is secured by suitble means such as nutted bolts 12, and within the casing is mounted an electric lamp socket 13 having an incandescent lamp 14 mounted therein. An extension cord 15 is adapted to be connected to a suitable source of electricity. A ground glass or other suitable light diffusing element 16 is placed across the interior of the casing C preferably a short distance in front of the light source 14. This light diffusing plate 16 can, if desired, be removed by sliding it out of a vertical slot 17 formed in the casing side wall 8.

Slidably received by the slot 17 is a partition 18 which can be inserted through the slot to be positioned transversely of the casing in a suitable guideway which will block off light between the light source 14 and the eye piece 10. However, the partition 18 has a pair of apertures 19 and 20 formed therethrough and it is preferred that the aperture 20 be extremely small while the aperture 19 is materially larger. The partition 18 has a light shield 21 secured to an edge thereof, and said shield is adapted to substantially cover the vertical slot 17 in the casing side wall 8.

Pivotally mounted by a nutted bolt 22 is a rotary disc 23 and said bolt is supported by the partition 18. A portion of the disc 23 extends through a slot 24 in the light shield 21, and that portion which extends through the light shield carries a plurality of graduations which, as the disc is rotated, are successively visible exteriorly of the casing and light shield, as best shown in Figs. 2, 4 and 5.

The rotary disc 23 has its major central portion taken up by an area 25 of graduated opacity. In Fig. 7 there is shown a segmental portion that is black, and as the disc is rotated in a counterclockwise direction the opacity is gradually decreased until an area of extremely low opacity is reached. If the disc 23 is formed of glass, a material which I prefer to use, I have found that a photographic film of graduated opacity is preferable for the portion 25 of the entire disc unit. This film 25 can be secured to the disc 23 by a suitable adhesive.

Outwardly concentric to the film portion 25 of graduated opacity is a circular band 26 which I prefer to color dark red. When the disc is rotatably mounted on the partition 18 the film or portion of graduated opacity 25 can be seen through the larger partition aperture 19, and the dark red band 26 will lie opposite the smaller partition aperture 20. The band 26 is of substantially constant opacity and as a result when the disc is rotated and the lamp 14 is illuminated a small dark red point of light can be viewed through the aperture 20.

When the apparatus is used the partition 18 is first removed from the casing and the lamp 14 is lighted and the patient views a diffused white light through the eye piece 10 and the entire area of the light diffusing plate 13. The partition is re-inserted in the casing after a predetermined time with the disc 23 set at the zero position indicated in Figs. 2, 4 and 5. This position brings the black segment of the disc across the aperture 19 so that no light is viewed. The patient then fixes his eyes upon the small red point of light at the aperture 20, and the disc is slowly rotated in a counterclockwise direction bringing disc portions of increasingly less opacity across the aperture 19. When the patient first observes light passing through the aperture 19 a reading is made of the graduations visible at a point level with the center of rotation of the disc and at the edge thereof. Thereupon successive readings at intervals are made and the readings are plotted in a curve to show the change in light adaptability of the eye. If the patient has normal visual purple regenerative powers he will be able to detect light at lower readings on the scale which relate to the disc areas of greater opacity and such a patient will more quickly regenerate visual purple in the eye. However, should there be a lack of vitamin A and a consequent inability to regenerate visual purple in a normal manner the return of the eye to its original light adaptable stage will take a longer period of time, and whereas in the first case the curve plotted as a result of the various readings will not change radically, a person who is deficient in vitamin A and with little powers of visual purple regeneration will react in such a way that the plotted curve will show a sharp dip and a longer required time for return to the condition existing before the exposure of the eye to the bright light of the diffuser plate.

With my apparatus it is possible to procure extremely accurate readings with a relatively simple structure, and due to the absence of numerous and complicated adjusting mechanisms, such as are utilized in apparatus where the actual light source intensity is fluctuated, it is possible for practitioners to immediately become proficient in its use. The only errors which can be made in the test are those which might be incident to improper cooperation on the part of the patient, and, of course, any type of apparatus is subject to such conditions.

It will, of course, be understood that various changes may be made in the details, form, arrangement and proportions of the various parts without departing from the scope of my invention.

What is claimed is:

1. In an ophthalmic device, a casing, a light source positioned within said casing, an eye piece in a portion of said casing spaced from said light source, a removable partition across the interior of said casing between said light source and said eye piece, said partition having a pair of closely spaced apertures therethrough, an element having a portion of graduated opacity movable relative to one of said partition apertures between said aperture and said light source, said element having another portion of substantially constant translucency movable past the other aperture in said partition, said last mentioned aperture being relatively small and defining, with said portion of constant translucency exposed thereby, an eye fixation point.

2. In an ophthalmic device, a casing having an eye piece, a light source within said casing and spaced from said eye piece, a partition positioned transversely of the interior of said casing and having a pair of closely spaced apertures therethrough, a disc supported for rotation adjacent said partition in a plane substantially parallel thereto, said disc having a portion opposite one of said partition apertures and providing various degrees of opacity between said light source and said aperture, and said disc having a substantially circular portion of a pre-determined degree of substantially constant translucency positioned to lie between the other of said partition apertures and said light source during rotation of said disc, said last mentioned aperture being relatively small and defining, with said portion of constant translucency exposed thereby, an eye fixation point.

ALFRED WILLIAM HUBBARD.